No. 646,791. Patented Apr. 3, 1900.
C. H. BEMENDERFER.
BICYCLE ATTACHMENT.
(Application filed Nov. 13, 1899.)
(No Model.)

Witnesses:
Inventor
C. H. Bemenderfer.
By James Sheehy
Attorney

UNITED STATES PATENT OFFICE.

CHARLES H. BEMENDERFER, OF GOSHEN, INDIANA.

BICYCLE ATTACHMENT.

SPECIFICATION forming part of Letters Patent No. 646,791, dated April 3, 1900.

Application filed November 13, 1899. Serial No. 736,866. (No model.)

*To all whom it may concern:*

Be it known that I, CHARLES H. BEMENDERFER, a citizen of the United States, residing at Goshen, in the county of Elkhart and State of Indiana, have invented new and useful Improvements in Bicycle Attachments, of which the following is a specification.

My invention relates to bicycle attachments and contemplates the provision of a simple, inexpensive, and light attachment readily applicable to an ordinary bicycle without entailing changes in the construction thereof and calculated to carry a considerable burden without greatly increasing the labor of the bicycle-rider.

The invention will be fully understood from the following description and claims when taken in conjunction with the annexed drawings, in which—

Figure 1:
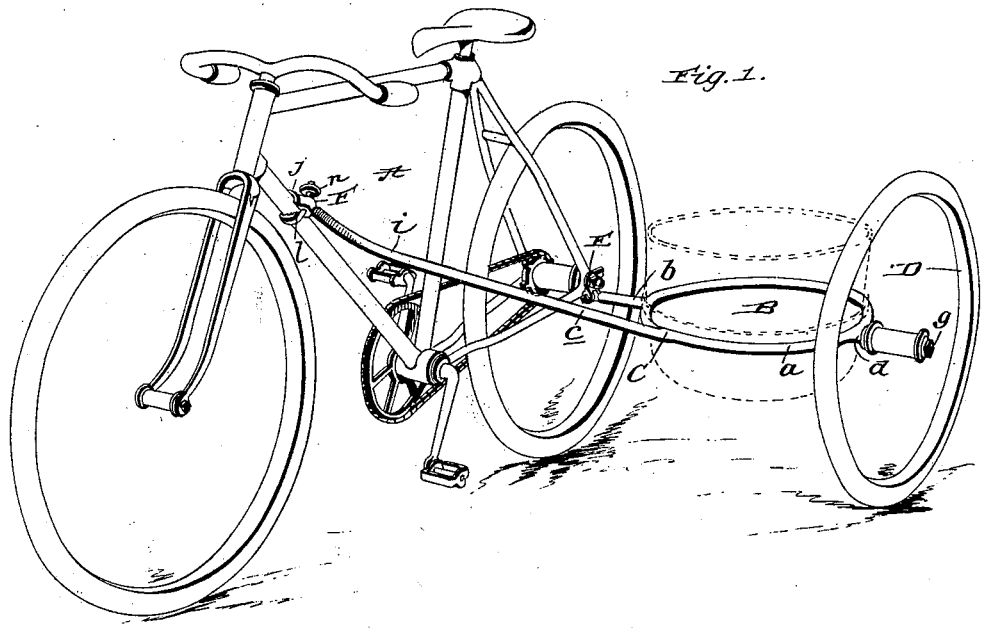
Figure 2:
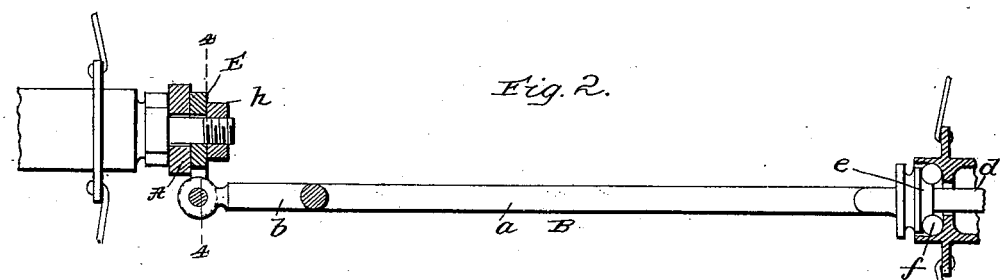
Figure 3:
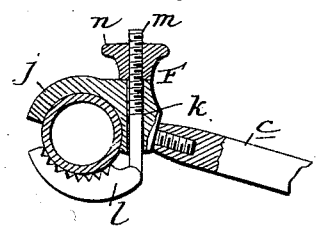
Figure 4:
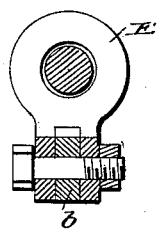
Figure 5:
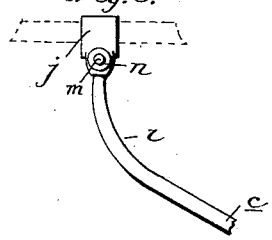

Figure 1 is a perspective view of an ordinary diamond bicycle equipped with my improved attachment. Fig. 2 is an enlarged transverse section of the rear portion of the attachment. Fig. 3 is an enlarged sectional view illustrative of the clip which is preferably employed to connect the forwardly-reaching arm of the attachment-frame to the bottom-line tube of the bicycle-frame. Fig. 4 is an enlarged section taken on broken line 4 4 of Fig. 2 and illustrating the connection between the lateral arm of the frame of the attachment and the rear axle of the bicycle. Fig. 5 is a detail plan view of a portion of the forwardly-reaching arm of the attachment-frame.

Referring by letter to the said drawings, A is an ordinary diamond-frame bicycle, and B is my improved attachment, which is designed to rest at one side of and be connected to the frame and the rear axle of the bicycle after the manner shown in Fig. 1. The attachment is made up of a frame C and a single traveling wheel D. The frame of the attachment may be made of solid metal or tubing, like that usually employed in the construction of bicycle-frames, and comprises a body $a$, a short lateral arm $b$, extending inwardly from the body, and a long arm $c$, reaching forwardly from the body. The body $a$ is open and preferably circular in form in order to render it light and enable it to receive and hold a round basket or other removable receptable after the manner illustrated by broken lines in Fig. 1. It may, however, be made in other shapes than round in order to adapt it to receive and hold receptacles of various shapes.

At a point diametrically opposite the arm $b$ the body $a$ is provided with a preferably-integral axle $d$. This axle is designed to receive the wheel D and is by preference equipped with the usual cones $e$ for the engagement of antifriction-balls $f$ and nut $g$ for securing the wheel D in position.

E is an apertured plate or eye which is connected, preferably, in a pivotal manner to the end of the frame-arm $b$ of the attachment, as shown in Fig. 4. This plate or eye E is designed to be placed on the usual extended portion of the rear axle of a bicycle and secured in position between the bicycle-frame and a nut $h$, screwed on the axle in the usual manner. The connection stated may obviously be expeditiously effected without entailing any change whatever in the construction of the ordinary bicycle.

The arm $c$ of the attachment-frame C reaches forwardly from the body $a$ and is also carried laterally inward toward the bicycle-frame, as shown in Fig. 1. It is provided at its forward end with a suitable clip F, designed to connect it to the bottom-line tube of a bicycle-frame and adjacent to its forward end has an intermediate portion $i$, disposed approximately at right angles to the bicycle-frame, as shown in Fig. 5. This latter enables the left leg of the bicycle-rider to freely move at the inner side of and clear the arm $c$ of the attachment-frame and constitutes one of the desirable features of my invention.

The clip F for connecting the forward end of the frame-arm $c$ to the bottom-line tube of the bicycle-frame is shown in detail in Fig. 3. It comprises a member $j$, fixedly connected to arm $c$ and provided with a bore $k$, a member $l$, having a threaded bolt $m$, which extends loosely through the bore of the first-named member, and a nut $n$, which is mounted on the rod $m$, above the member $j$.

Through the medium of the clip F the arm $c$ of the attachment-frame may be connected to the bicycle-frame as easily and expeditiously as the arm $b$ of the said frame is connected to the rear axle of the bicycle, and this without injuring the bicycle-frame or necessitating any change in the construction thereof.

When connected to a bicycle in the manner described, there is no liability of my improved attachment being casually detached. It will also be observed that the attachment is not liable to interfere with the movement of the rider's legs or render the operations of mounting and dismounting difficult.

While very light in weight, the attachment is adapted to carry burdens of considerable weight without interfering with the management of the bicycle and without materially increasing the labors of the rider.

The manner in which the attachment is connected to a bicycle permits of it being quickly and easily disconnected from a bicycle when the latter is to be used in the usual manner. The connection employed also permits of the attachment being readily connected to drop-frame bicycles as well as those having diamond frames.

In using the illustrated embodiment of the invention an errand-boy has but to place a basket of goods in the body $a$ of the attachment-frame and then mount the bicycle and ride to the point of delivery. On his return to the store the basket may be readily removed and carried into the store to receive another order.

Having thus described my invention, what I claim is—

1. In the bicycle attachment described, the frame comprising the horizontal open body $a$ adapted to receive and hold baskets and other receptacles in such manner as to permit of ready removal of the same, the arm $b$ arranged in the same horizontal plane as the body $a$ and formed integral with and extending laterally therefrom; said arm being adapted to be connected to the rear axle of a bicycle, the integral axle $d$ formed integral with and arranged in the same horizontal plane as the body and extending laterally from said body at a point opposite the arm $b$, and the arm $c$ reaching forwardly and upwardly from the body $a$ at a point intermediate of the arm $b$ and axle $d$ and adapted to be connected with the bicycle-frame; in combination with the traveling wheel D mounted on the axle $d$ of the frame, substantially as specified.

2. In a bicycle attachment, a frame comprising an open body adapted to receive and hold a removable receptacle, an arm extending laterally from said body and provided with a pivoted eye adapted to be secured on the rear axle of a bicycle, an axle extending outwardly from the body at a point opposite to the arm, and a second arm reaching forwardly from the body and having a clip at its forward end arranged to engage the bicycle-frame and also having the intermediate angularly-disposed portion $i$, and a wheel mounted on the axle of the frame, substantially as specified.

In testimony whereof I have hereunto set my hand in presence of two subscribing witnesses.

CHARLES H. BEMENDERFER.

Witnesses:
JUDSON C. WOLFINGER,
B. F. DEAHL.